US008270000B2

(12) United States Patent
Funakawa et al.

(10) Patent No.: US 8,270,000 B2
(45) Date of Patent: Sep. 18, 2012

(54) IMAGE PROCESSING APPARATUS

(75) Inventors: Hisataka Funakawa, Aichi-ken (JP); Takehisa Nakao, Toyokawa (JP)

(73) Assignee: Konica Minolta Business Technologies, Inc., Tokyo (JP)

(*) Notice: Subject to any disclaimer, the term of this patent is extended or adjusted under 35 U.S.C. 154(b) by 978 days.

(21) Appl. No.: 10/799,758

(22) Filed: Mar. 15, 2004

(65) Prior Publication Data
US 2004/0190060 A1 Sep. 30, 2004

(30) Foreign Application Priority Data
Mar. 28, 2003 (JP) ................................. 2003-092333

(51) Int. Cl.
G06F 3/12 (2006.01)
G06K 15/00 (2006.01)
(52) U.S. Cl. ...................................... 358/1.15; 358/1.16
(58) Field of Classification Search .................. None
See application file for complete search history.

(56) References Cited

U.S. PATENT DOCUMENTS

| | | | |
|---|---|---|---|
| 5,930,003 A | | 7/1999 | Kondo |
| 6,069,706 A * | | 5/2000 | Kajita et al. ................. 358/1.15 |
| 6,351,315 B2 | | 2/2002 | Kusumoto |
| 6,538,764 B2 * | | 3/2003 | Ueda ............................ 358/1.16 |
| 6,687,742 B1 * | | 2/2004 | Iwazaki ........................ 709/206 |
| 6,691,136 B2 * | | 2/2004 | Lee et al. ...................... 707/200 |
| 6,961,136 B2 * | | 11/2005 | Ogura et al. ................. 358/1.14 |
| 7,268,902 B2 * | | 9/2007 | Hino ............................ 358/1.15 |

FOREIGN PATENT DOCUMENTS

| | | |
|---|---|---|
| JP | 02-057061 | 2/1990 |
| JP | 5-130343 | 5/1993 |
| JP | 05130343 A * | 5/1993 |
| JP | 7-336471 | 12/1995 |
| JP | 2001-34447 | 2/2001 |
| JP | 2002-118702 | 4/2002 |
| JP | 2002-344688 | 11/2002 |
| JP | 2003-6213 | 1/2003 |
| JP | 2003-87482 | 3/2003 |

OTHER PUBLICATIONS

Japanese Office Action dated Nov. 6, 2007, regarding corresponding Japanese patent application No. 2003-092333.
Notification of Reasons for Refusal mailed Aug. 2, 2005, directed to counterpart Japanese application.
Japanese Notification of Reasons for Refusal, mailed Oct. 27, 2009, directed to corresponding Japanese Patent Application No. 2007-340044; 13 pages.
Decision of Final Refusal dated Jan. 20, 2010, directed to Japanese Application No. 2007-340044; 5 pages.

* cited by examiner

Primary Examiner — Twyler Haskins
Assistant Examiner — Marcus T Riley
(74) Attorney, Agent, or Firm — Morrison & Foerster LLP

(57) ABSTRACT

An image processing apparatus that stores image data in a volatile memory, and also transmits data corresponding to the stored image data to a mail server by attaching it to an electronic mail addressed to the image processing apparatus. If it is detected, prior to an execution of an image processing such as printing, that the image data has been erased from the volatile memory due to a power failure or the like, the image processing apparatus acquires the data corresponding to the image data from the mail server and resumes the image processing job.

22 Claims, 16 Drawing Sheets

Fig. 3A

FAX RECEPTION LOG

| IDENTIFIER | TRANSMITTER'S FAX NUMBER | RECEPTION DATE | RECEPTION TIME | NUMBER OF PAGES |
|---|---|---|---|---|
| F0303010001 | 0663733963 | 2003/03/01 | 09:10:33 | 1 |
| F0303010002 | 0663733963 | 2003/03/01 | 09:15:24 | 12 |
| F0303010003 | 0663734278 | 2003/03/01 | 09:56:45 | 3 |
| | | | | |

Fig. 3B iFAX TRANSMISSION LOG

| MESSAGE-ID | TRANSMISSION DATE | TRANSMISSION TIME | IDENTIFIER |
|---|---|---|---|
| 20030301091112 | 2003/03/01 | 09:11:12 | F0303010001 |
| 20030301091602 | 2003/03/01 | 09:16:02 | F0303010002 |
| 20030301095743 | 2003/03/01 | 09:57:43 | F0303010003 |
| | | | |

Fig. 5A iFAX TRANSMISSION LOG

| MESSAGE-ID | TRANSMISSION DATE | TRANSMISSION TIME | PAGE NUMBER | IDENTIFIER |
|---|---|---|---|---|
| 20030301091012001 | 2003/03/01 | 09:10:12 | 1 | R0303010001 |
| 20030301091045001 | 2003/03/01 | 09:10:45 | 2 | R0303010001 |
| 20030301091121001 | 2003/03/01 | 09:11:21 | 3 | R0303010001 |
|  |  |  |  |  |

Fig. 5B

DOCUMENT SCAN LOG

| IDENTIFIER | SCANNING DATE | SCANNING END TIME | NUMBER OF PAGES | NUMBER OF TRANSMITTED PAGES |
|---|---|---|---|---|
| R0303010001 | 2003/03/01 | 09:10:33 | 3 | 2 |
|  |  |  |  |  |

Fig. 7

FAX TRANSMISSION LOG

| IDENTIFIER | TRANS-MISSION DATE | TRANSMISSION START TIME | TRANSMISSION END TIME | TOTAL NUMBER OF PAGES | NUMBER OF TRANSMITTED PAGES |
|---|---|---|---|---|---|
| R0303010001 | 2003/03/01 | 09:10:33 | 09:12:37 | 3 | 2 |

IMAGE PROCESSING APPARATUS

This application is based on an application No. 2003-092333 filed in Japan, the content of which is hereby incorporated by reference.

BACKGROUND OF THE INVENTION (1) Field of the Invention

The present invention relates to an image processing apparatus that can transmit and receive data to/from an external apparatus.

(2) Description of the Related Art

In recent years, image processing apparatuses featuring many functions have been in practical use. The functions of such multifunction image processing apparatuses include transmitting and receiving faxes to/from an external fax machine via a telephone line, and transmitting and receiving information to/from an external apparatus via a network, as well as other normal functions provided in copiers or printers. Hereinafter, such a multifunction image processing apparatus is referred to as a Multi-Function Peripheral (MFP).

In general, an MFP has a storage apparatus with a relatively large capacity, such as a Hard Disk Drive (HDD), so as to store, for example, print data received from an external computer, or fax data received from an external apparatus.

However, as it appears not to be an exception, the demand for cost reduction is strong even for the MFPs that provide various functions as mentioned above. On the other hand, large-capacity storage apparatuses such as HDD are still expensive in spite of the current tendency toward low prices.

SUMMARY OF THE INVENTION

The object of the present invention is therefore to provide an image processing apparatus that can be in practical use without a large-capacity storage apparatus.

The above object is fulfilled by an image processing apparatus for transmitting and receiving data to/from an external apparatus that has a storage apparatus, the image processing apparatus comprising: a first data acquiring unit that acquires image data to be subjected to image processing; a storage unit that stores the acquired image data; a transmission unit that transmits the acquired image data to the external apparatus so that the transmitted image data is stored in the storage apparatus thereof; a judgment unit that judges, prior to commencement of the image processing, whether the image data is stored in the storage unit; a second data acquiring unit that acquires the image data from the external apparatus if the judgment unit judges negatively; and an image processing unit that executes the image processing using the image data stored in the storage unit if the judgment unit judges positively, and executes the image processing using the image data acquired by the second data acquiring unit if the judgment unit judges negatively.

With the above-stated construction, the image processing apparatus can acquire image data, which the image processing apparatus has transmitted in advance, from an external apparatus for execution of image processing if the image data is not stored in the storage unit of the image processing apparatus, and therefore the image processing apparatus does not necessarily have a large-capacity storage unit such as HDD. Off course, however, the present invention can be applied to an image processing apparatus that has a large-capacity storage unit. In that case, the image processing apparatus can transmit image data to an external apparatus to use it later if the large-capacity storage unit has consumed the available storage space. It should be noted here that the "image data" refers to data in a typical format for image processing (for example, bit map data), and to data in other formats for image processing (for example, Tag Image File Format (TIFF)).

The above-described image processing apparatus may further comprise a deletion instructing unit that, after the image processing is completed, sends to the external apparatus an instruction to delete the image data from the storage apparatus.

The above-stated construction secures that the image processing apparatus does not put a heavier load than necessary on the storage apparatus of the external apparatus.

It should be noted here that the storage apparatus of the external apparatus is not limited to a certain type, but may be any type such as HDD or a semiconductor memory. Also, "after the image processing is completed" is not limited to the meaning "immediately after the image processing is completed".

In the above image processing apparatus, the transmission unit may transmit the acquired image data page by page to the external apparatus.

With the above-stated construction, the image processing apparatus can execute the image processing page by page by storing one page of image data, which is acquired from the external apparatus, into the storage unit for each execution of the image processing. This allows the capacity of the storage unit to be small.

The above image processing apparatus may further comprise a memory that stores information regarding progress of the image processing, where when executing the image processing using the image data acquired by the second data acquiring unit, the image processing unit refers to the information stored in the memory and executes the image processing for a part of the image data that has not been subjected to the image processing yet.

With the above-stated construction, when resuming the image processing after a recovery from a power failure, the image processing apparatus can avoid processing a part of the image data that has already been processed. When having transmitted all pages of the image data to the external apparatus as a file in advance, the image processing apparatus may resume the image processing by starting with the first page of part of the image data that has not been processed yet; and when transmitting the image data page by page to the external apparatus, the image processing apparatus may resume the image processing by acquiring a page that follows the last page of part of the image data that has been completely processed. It should be noted here that "information regarding progress of the image processing" may be, for example, the number of pages that have been subjected to the image processing (for example, image formation or fax transmission).

In the above image processing apparatus, the external apparatus may function as a mail server, the transmission unit may transmit to the external apparatus an electronic mail addressed to the image processing apparatus and containing the acquired image data, and the second data acquiring unit may, if the judgment unit judges negatively, acquire the electronic mail from the external apparatus and extract the image data from the acquired electronic mail.

With the above-stated construction, it is possible to assign an identifier (for example, Message-ID) to each electronic mail. This makes it easy to identify files that, for example, have been transmitted, are to be acquired, or are to be deleted. It should be noted here that the method for transmitting the data to an external apparatus is not limited to the electronic mail, but may be any other proper method.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 3A shows an example of the fax reception log recorded in the nonvolatile memory 140 in the embodiments of the present invention;

FIG. 3B shows an example of the iFAX transmission log recorded in the nonvolatile memory 140 in the embodiments of the present invention;

FIG. 5A shows an example of the iFAX transmission log recorded in the nonvolatile memory 140 in Embodiment 2 or the like;

FIG. 5B shows an example of the document scan log in Embodiment 2 or the like;

FIG. 7 shows an example of the fax transmission log that contains "the number of transmitted pages" information;

DESCRIPTION OF THE PREFERRED EMBODIMENTS

The following describes preferred embodiments of an image processing apparatus of the present invention with reference to the attached drawings.

Embodiment 1

1. Construction of Image Processing Apparatus and Network System

Figure 1:
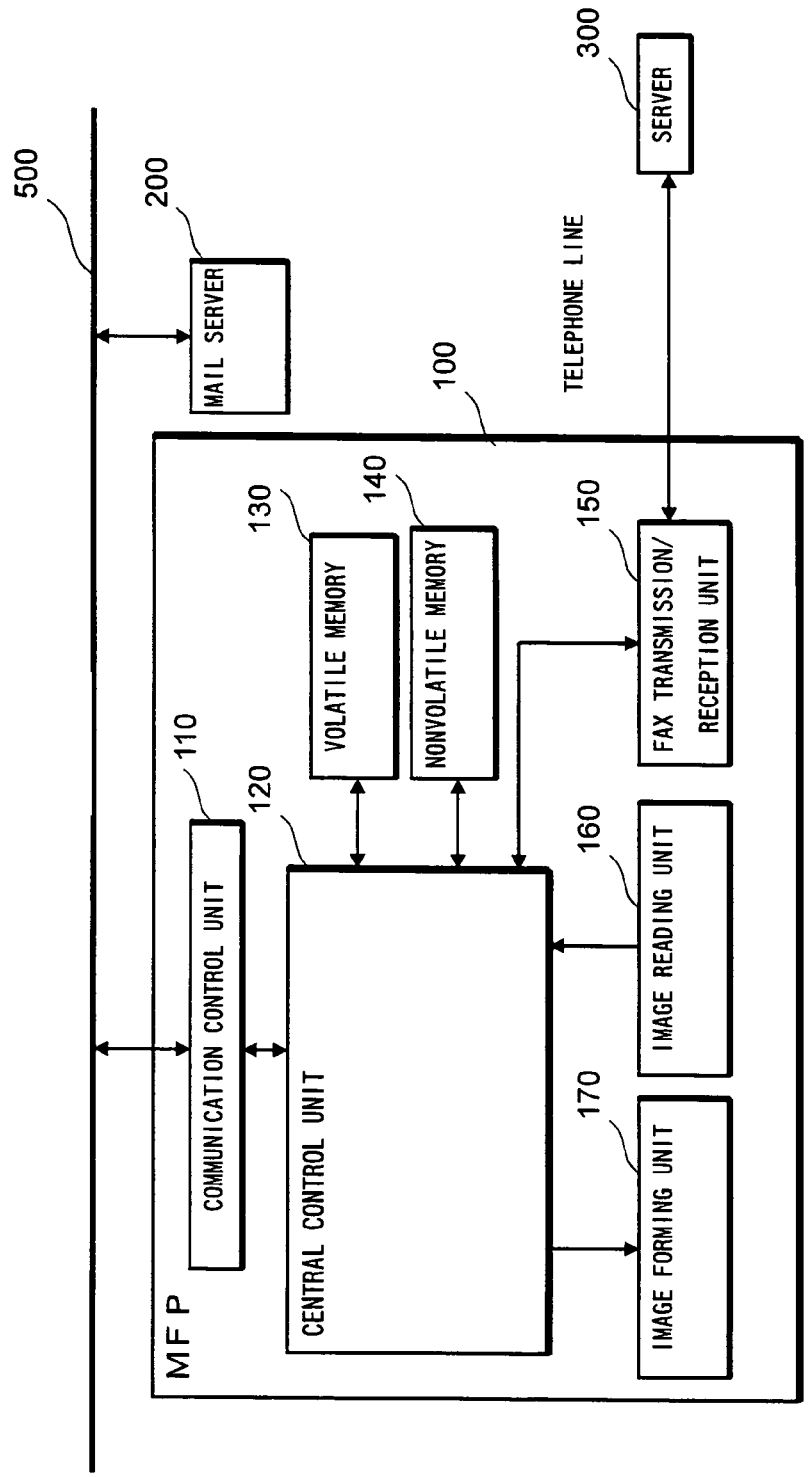
FIG. 1 is a functional block diagram showing the construction of an image processing apparatus (MFP) in the embodiments of the present invention, and an example of a network system including the MFP.

FIG. 1 is a functional block diagram showing the construction of an image processing apparatus (MFP) in Embodiment 1 of the present invention, and an example of a network system including the MFP. An MFP 100 includes a communication control unit 110, a central control unit 120, a volatile memory 130, a nonvolatile memory 140, a fax transmission/reception unit 150, an image reading unit 160, and an image forming unit 170.

The communication control unit 110 controls communication between the MFP 100 and external apparatus performed via a network such as LAN 500. A network InterFace (IF) card or the like can be used for the communication. In Embodiment 1, the LAN 500 is connected to a mail server 200, enabling the MFP 100 to transmit and receive electronic mails. It should be noted here that an external mail server connected to the LAN 500 via the Internet may be used instead of the mail server 200, which is directly connected to the LAN 500.

The central control unit 120 is achieved by a CPU and controls various processes including: acquiring data in a certain format such as fax; expanding the acquired data to be image data and store the image data into the volatile memory 130; writing or reading various types of log information regarding fax or Internet fax (hereinafter referred to as iFAX) transmission/reception to/from the nonvolatile memory 140; instructing to create or transmit electronic mails for iFAX; and instructing to download electronic mails.

It should be noted here that dedicated hardware units may be used for various processes such as image processing performed in the data expansion.

The operation of the central processing unit 120 will be described in detail later.

The volatile memory 130 temporarily stores the image data. More specifically, the volatile memory 130 stores image data including: (i) image data that is generated by expanding print data transmitted from an external computer, and/or (ii) image data acquired when the image reading unit 160 scans a document. After image data stored in the volatile memory 130 has been processed for image formation (for example, printing), a storage area allocated to the image data is freed for another image data to be processed next.

The nonvolatile memory 140 stores various types of log information as described above. The fax transmission/reception unit 150 transmits and receives normal faxes (G3, G4 or the like) to/from an external apparatus (server 300 in the example shown in FIG. 1) via a public telephone line. As will be described later, in the present embodiment, the data of a received fax (hereinafter referred to as normal fax data) is transferred to the central control unit 120. The central control unit 120 expands it to be image data and stores the image data in the volatile memory 130. The central control unit 120 converts it into a Tag Image File Format. (TIFF), and attaches it to an electronic mail addressed to the MFP 100, and transmits the electronic mail to a mail server as iFAX. Hereinafter, an electronic mail for iFAX is referred to as "iFAX electronic mail", and image data of an iFAX is referred to as "iFAX data". It should be noted here that "iFAX" is defined in RFC 2305, RFC2532 or the like, where RFC stands for Request For Comments. With the iFAX, a file in the TIFF format can be attached to an electronic mail and transmitted with it to a destination.

The image reading unit 160 has, for example, an image scanner. The image forming unit 170 has, for example, any normal type of print engine for image formation. Since these are known technologies, details of them are not provided here.

The image processing apparatus of the present embodiment is characterized by transmitting image data such as normal fax data received from an external apparatus to another external apparatus (mail server 200 in the present embodiment) so that if a power failure, a power trouble or the like occurs and erases image data stored in the volatile memory 130 in the middle of an image forming process, the MFP 100 can download iFAX data from a storage unit in the mail server 200 and complete the image process using the downloaded data.

The following describes how image data received from outside the MFP 100 is transmitted to the mail server 200 as iFAX data.

2. Operation of Central Control Unit 120

Figure 2:
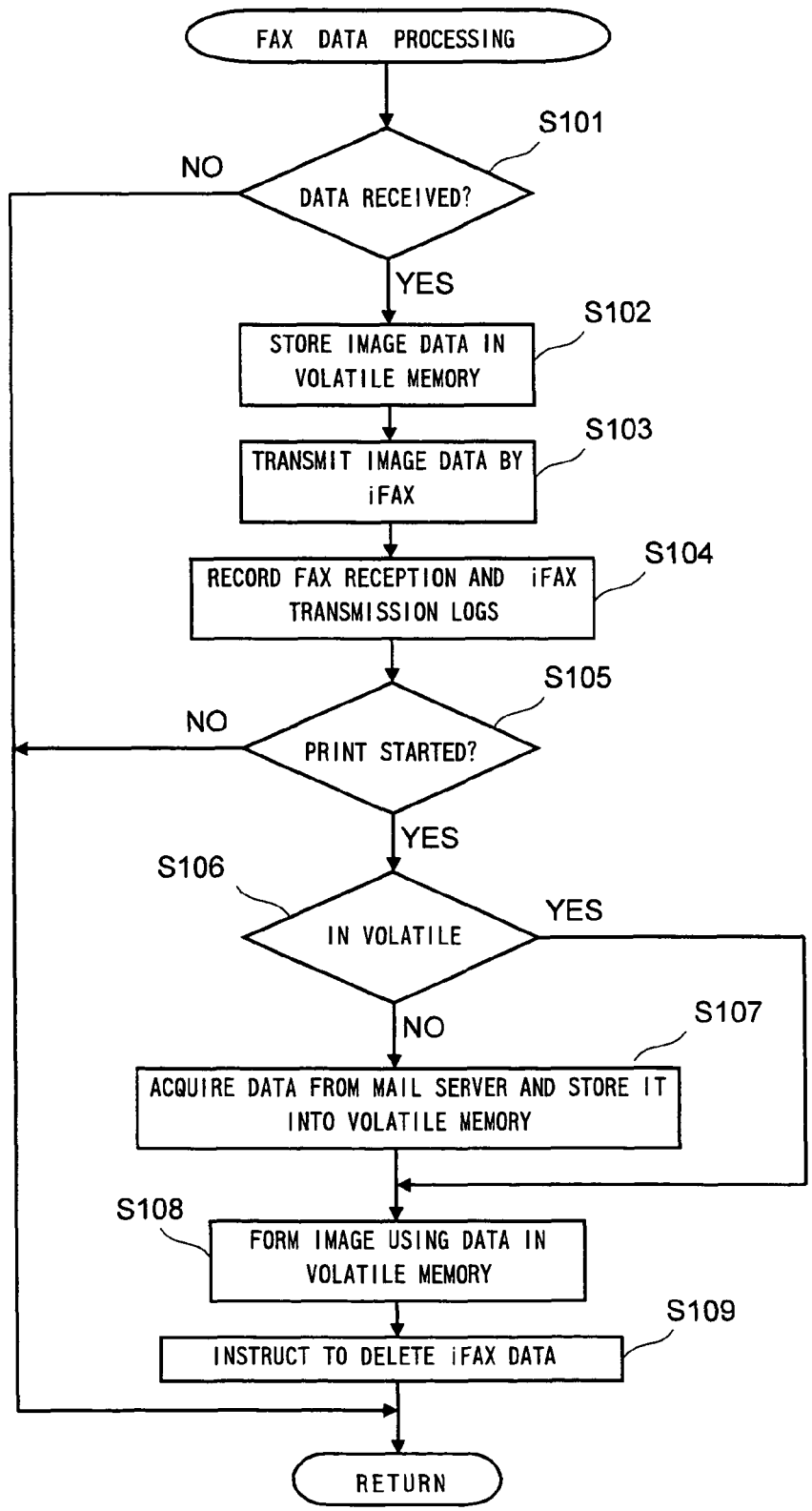
FIG. 2 is a flowchart of the procedures performed after the MFP 100 receives fax data from outside.

The operation of the central control unit 120 will be described here. FIG. 2 is a flowchart of the procedures performed after the MFP 100 receives fax data from outside. It should be noted here that though the flowchart of FIG. 2 is described as the procedures of a sub routine that is called by the main program (not illustrated) that is activated as the MFP 100 is powered on, a specific method for realizing the operation of the central control unit 120 is not limited to this, but can be replaced with other one in accordance with the environment including a program language to be used.

As the first step in the procedures of processing received fax data shown in FIG. 2, it is judged whether data has been received (S101) The judgment result will be in the positive when any of the following data is received by the MFP 100: normal fax data received by the fax transmission/reception unit 150; iFAX data transmitted via the LAN 500; and print data transmitted from an external computer or the like via the LAN 500. If it is judged negatively in this step (S101: "NO"), the control returns to the main program (not illustrated) without any particular operation being done.

If it is judged positively in this step (S101: "YES"), the received data is, if necessary, expanded to be image data, and the image data is stored in the volatile memory 130 (S102). On the other hand, the image data is converted into the TIFF format by the central control unit 120, attached to an electronic mail which is addressed to the MFP 100, and transmitted as an iFAX (S103). The central control unit 120 performs various processes including: converting the image data into the TIFF format; creating an electronic mail containing the converted data; and instructing to transmit an iFAX electronic mail addressed to the MFP 100 itself. These operations are not described in detail since they are known.

The central control unit 120 records a fax reception log (if normal fax data has been received) and an iFAX transmission log into the nonvolatile memory 140 (S104).

FIGS. 3A and 3B show examples of the fax reception log and the iFAX transmission log recorded in the nonvolatile memory 140 in Embodiment 1.

In the present embodiment, an identifier is assigned to each received piece of normal fax data for the management of fax reception logs. The nonvolatile memory 140 stores such information as a transmitter's fax number, a reception date, a reception time, and the number of pages, in correspondence with each identifier of the received normal fax data (see FIG. 3A).

FIG. 3B shows an example of the iFAX transmission log that is recorded in the nonvolatile memory 140 each time the MFP 100 transmits an iFAX electronic mail addressed to the MFP 100 itself, to the mail server 200. In the present embodiment, each time the MFP 100 transmits an iFAX, the MFP 100 assigns an identifier to the iFAX, and stores such information as a local part of Message-ID (that may contain the "@domain" portion), a transmission date, a transmission time, and an identifier of normal fax data that corresponds to the iFAX and is recorded in the fax reception log, in correspondence with each iFAX identifier.

In the next step of the procedures, the central control unit 120 judges whether it has been instructed to start printing image data (S105). In some cases (for example, if a piece of normal fax data has been received), a positive judgment is made automatically even if an instruction to start printing has not been issued. On the other hand, when an image forming process has been suspended after the image data had been stored in the volatile memory 130 due to paper empty, paper jam or the like (that is, when the image data is not erased from the volatile memory during the suspension of the image formation), the central control unit 120 waits for a notification of, for example, depression of a start button (not illustrated), supply of paper, or elimination of paper jam, as a specific instruction to start printing. If it is judged positively (S105: "YES"), it is judged whether a piece of image data specified for the printing is stored in the volatile memory 130 (S106).

The pieces of image data stored in the volatile memory 130 are managed by a job management table that is created in the volatile memory 130 and contains information such as the memory addresses of the pieces of image data. With this arrangement, the central control unit 120 can judge whether a piece of image data instructed to be printed is stored in the volatile memory 130 by referring to the job management table. It should be noted here that in the MFP 100 of the present invention, the identifier of the normal fax data (see FIG. 3A) corresponding to a currently executed print job needs to be stored in the nonvolatile memory 140 (alternatively, a flag indicating whether the print job has been completed is attached to each entry of the fax reception log). This is because if all data concerning the currently executed print job is erased due to a power failure or the like, it is impossible to resume the print job after the MFP recovers from the power failure.

If it is judged positively in step S106 (S106: "YES"), an image is formed using the image data for the printing (S108).

If it is judged negatively in step S106 (S106: "NO"), which may happen, for example, when image data is erased from the volatile memory 130 due to a power failure that has occurred during an execution of a print job, the central control unit 120 downloads the electronic mail containing the iFAX and having the mail address of the MFP 100 from the mail server 200, and expands the iFAX data to image data and stores the image data into the volatile memory 130 for printing (S107). As will be described later, the expansion of an iFAX data to image data requires image format conversion, which is not explained in detail here.

To download an iFAX electronic mail which contains image data instructed to be printed out from the mail server 200, the central control unit 120 refers to the iFAX transmission log recorded in the nonvolatile memory 140. More particularly, the central control unit 120 issues the top command, which is defined in a POP3 protocol (see RFC1939), to acquire the header information (including Message-ID) of the mail to be downloaded, from the mail server 200, and identifies the message number (message-ID) of the electronic mail by referring to the acquired header information, then downloads the electronic mail having the identified message number by issuing the "retr" command.

After the download, the central control unit 120 forms an image using the image data stored in the volatile memory 130 (S108).

In the present embodiment, an instruction to delete the iFAX electronic mail which has been downloaded is then issued to the mail server 200 (S109). More particularly, to delete the iFAX electronic mail, the central control unit 120 issues the "dele" command specifying the message number.

As described above, without a large-capacity storage apparatus such as HDD, the MFP 100 in the present embodiment can deal with problems, such as an erroneous erasure of image data from the volatile memory 130, that are caused by a power failure or the like. Up to now, dealing with normal fax data received from outside has been explained in detail. However, if an iFAX electronic mail is received from outside, it can be dealt with in a similar manner. For example, after receiving an iFAX electronic mail from outside, the MFP 100 may transmit an iFAX electronic mail addressed to the MFP 100 itself to a mail server in advance. With this arrangement, if a power failure occurs after the original mail is downloaded and deleted from the mail server, the mail addressed to the MFP 100 itself can be downloaded from the mail server to deal with the above-described problems.

Similarly, when print data is received from an external computer or the like via the LAN 500, the MFP 100 may transmit an iFAX electronic mail addressed to the MFP 100 itself and containing image data that is generated by expanding the print data, to a mail server in advance. With this arrangement, even if the image data is erased from a volatile memory, the MFP 100 can resume the printing without requesting a computer or the like to transmit the print data.

A method for transmitting image data to an external apparatus is not limited to the above-described one in which the image data is attached to an iFAX electronic mail addressed to the sender itself and then transmitted to a mail server, but may be any method in so far it is possible to identify and acquire a desired piece of image data as needed.

Embodiment 2

Now, the second embodiment of the present invention will be explained.

In the above-described Embodiment 1, the MFP 100 receives normal fax data, iFAX data, print data or the like from outside and prints out the received data. The method of Embodiment 1 can be applied to other cases. For example, the MFP 100 can obtain image data by scanning a document using the image reading unit 160, and transmit the obtained image data by fax using the fax transmission/reception unit 150. The following describes the case in detail.

Figure 4:
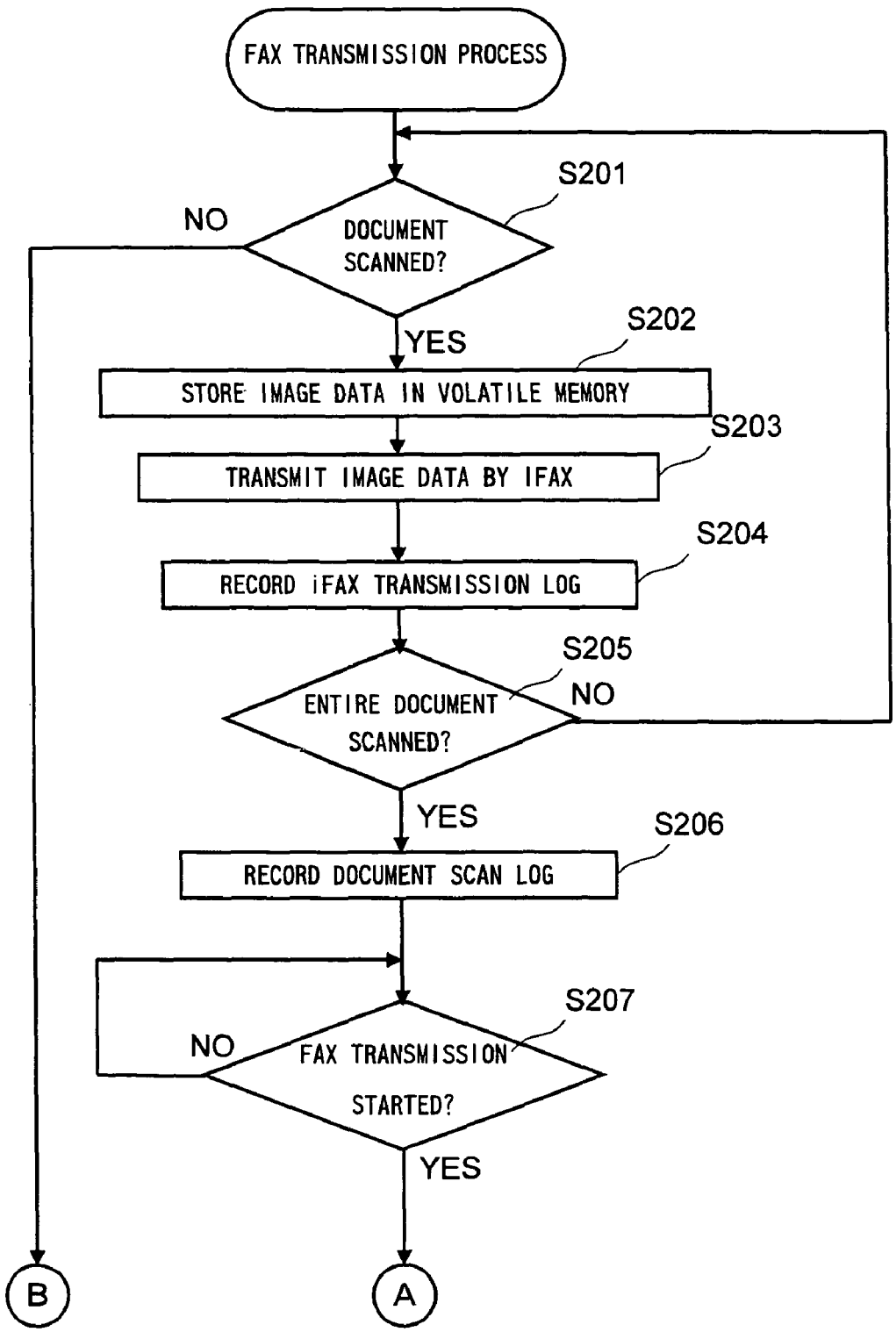
FIG. 4 is a flowchart of the procedures of the central control unit 120 for transmitting image data, which is obtained by the image reading unit 160 through scanning a document, by fax.

FIG. 4 is a flowchart of the procedures of the central control unit 120 for transmitting image data, which is obtained by the image reading unit 160 through scanning a document, by fax. In the present embodiment, the imaged data obtained by scanning documents is transmitted page by page to a mail server by iFAX in advance, and if the image data to be transmitted by fax is erased from the volatile memory 130 in the middle of the transmission due to a power failure or the like, only yet-to-be-transmitted pages of the image data are downloaded from the mail server and transmitted by fax.

In the fax transmission process shown in FIG. 4, the central control unit 120 first judges whether the image reading unit 160 has scanned a document (S201). If it is judged positively, the central control unit 120 stores image data, which has been obtained by the image reading unit 160 through the scanning of the document, into the volatile memory 130 (S202). The central control unit 120 then controls the communication control unit 110 to transmit an iFAX electronic mail addressed to the MFP 100, containing the obtained image data to the mail server 200 page by page (S203).

The central control unit 120 then records the iFAX transmission log in the nonvolatile memory 140 (S204). FIG. 5A shows an example of the iFAX transmission log in Embodiment 2. In the present embodiment, the iFAX transmission log information is recorded for each page of the obtained image data since the image data is transmitted to the mail server 200 page by page. As shown in FIG. 5A, in addition to a local part of Message-ID, a transmission date, and a transmission time that are assigned by the MFP 100, a page number and an identifier of a document scanning job that is assigned thereto at the start thereof are recorded as well. The steps S201 to S204 are repeated until it is judged in step S205 that the document has been scanned completely (S205).

If it is judged in step S205 that the document has been scanned completely (S205: "YES"), the central control unit 120 records a document scan log in the nonvolatile memory 140 (S206).

FIG. 5B shows an example of the document scan log in Embodiment 2. In the present embodiment, each entry of the document scan log includes: an identifier of a document scanning job, a scanning date, a scanning end time, the number of pages in total, and the number of transmitted pages which indicates the number of pages having been transmitted by fax, and is an example of information that indicates the progress of the fax transmission.

In the next step S207, it is judged whether a fax transmission has started. If it is judged that a fax transmission has started (S207: "YES"), the control moves to step S208 of the flowchart shown in FIG. 6. In step S208, it is judged whether the image data to be transmitted is stored in the volatile memory 130 (S208). If it is judged positively (S208: "YES"), the image data is transmitted by fax (S210). In the present embodiment, each time a page of the image data is transmitted, "the number of transmitted pages" in the document scan log recorded in the nonvolatile memory 140 is updated (S211).

With the above-described arrangement, if the image data is erased from the volatile memory 130 in the middle of the fax transmission, the MFP 100 can recognize the number of not-transmitted pages by referring to "the number transmitted pages" in the document scan log, download from the mail server 200 a portion of the iFAX electronic mail that corresponds to the pages that have not been transmitted yet, and transmit the downloaded pages by fax. That is to say, if it is judged negatively in step S208 (S208: "NO"), the central control unit 120 downloads from the mail server 200 a portion of the iFAX electronic mail that corresponds to the pages that have not been transmitted yet, and expands the downloaded data to image data and stores the image data into the volatile memory 130 (S209), and then transmits the image data by fax (S210).

As is the case with Embodiment 1, an instruction to delete the electronic mail containing the downloaded iFAX is then issued to the mail server 200 (S212). However, the deletion of the data may not necessarily be performed immediately after the download since the erasure of the image data may happen again, but may be performed after it is judged in step S213 that all pages have been transmitted (S213: "YES"), or may be deleted on a regular basis (for example, each day at a predetermined time).

If it is judged in step S213 that all pages have been transmitted (S213: "YES"), the fax transmission process ends. In the above-described example, "the number of transmitted pages" information is recorded as an item of the document scan log. The construction is convenient since the information can be used when the image forming unit 170 of the MFP 100 prints out the image data. However, "the number of transmitted pages" information may be recorded as an item of the fax transmission log, as shown in FIG. 7.

Now, the operation of the apparatuses in the network system in the present embodiment will be described.

Figure 8:
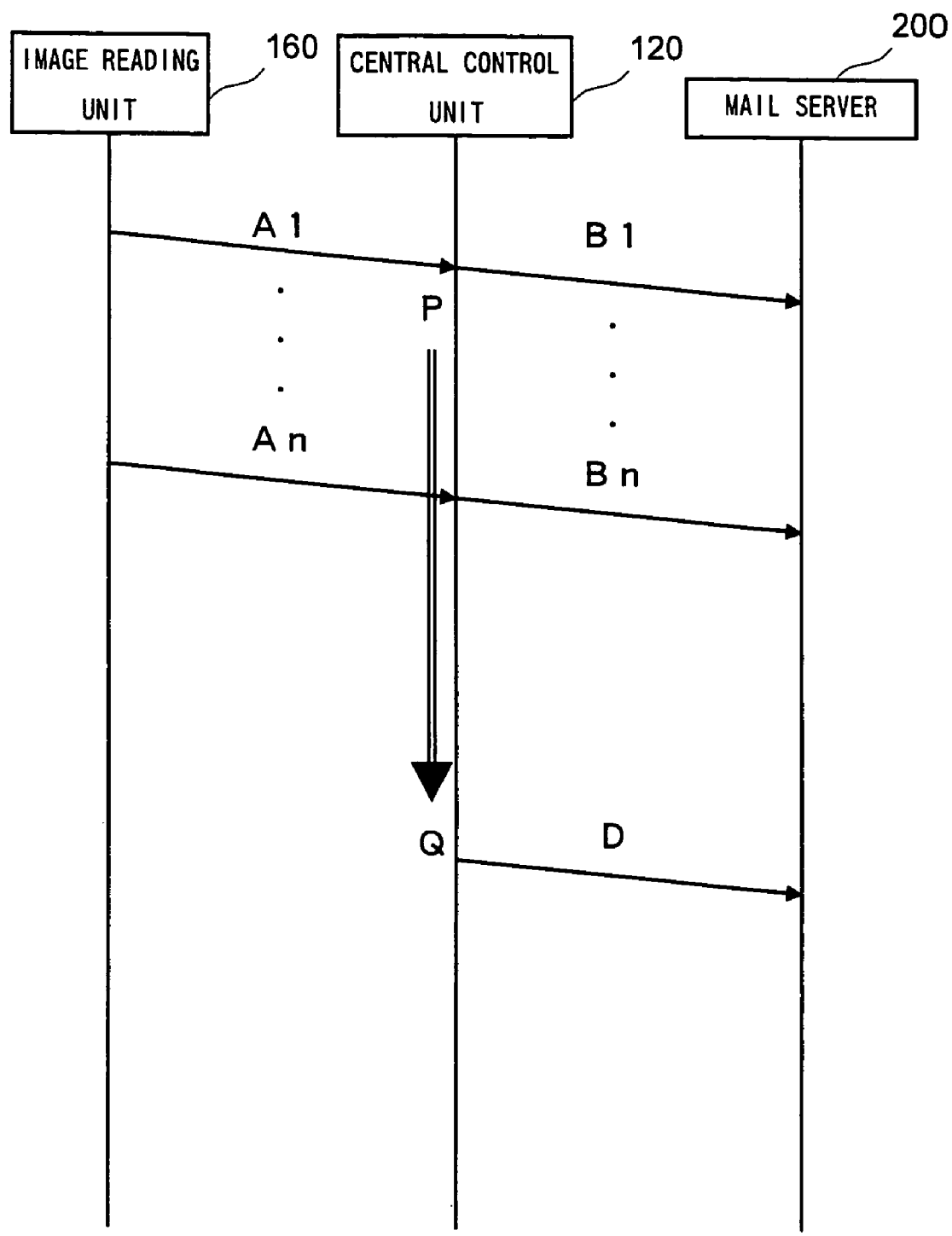
FIG. 8 is a sequence diagram showing the operation of the apparatuses in a normal fax transmission, that is to say, when a fax transmission is completed without having any problem such as a power failure.

First, a case where a fax transmission is completed without any problem during the fax transmission will be explained. FIG. 8 is a sequence diagram showing the operation of the apparatuses in a normal fax transmission, that is to say, when a fax transmission is completed without having any problem such as a power failure. As shown in FIG. 8, the image reading unit 160 scans n pages of document and generates image data page by page, and transmits the generated image data to the central control unit 120 in sequence (A1-An). The fax transmission/reception unit 150 starts transmitting the image data by fax with timing P when the first page of image data (A1) is transmitted to the central control unit 120.

On the other hand, the image data generated through the scanning of document is transmitted to the mail server 200 by iFAX page by page (B1-Bn). Since it is supposed that no problem occurs during the fax transmission, the MFP 100 completes the fax transmission without downloading the electronic mail containing iFAX of the image data from the mail server 200. The central control unit 120 issues the delete command D instructing to delete the iFAX electronic mails to the mail server 200, with timing Q when then pages of image data are completely transmitted by fax.

Figure 9:
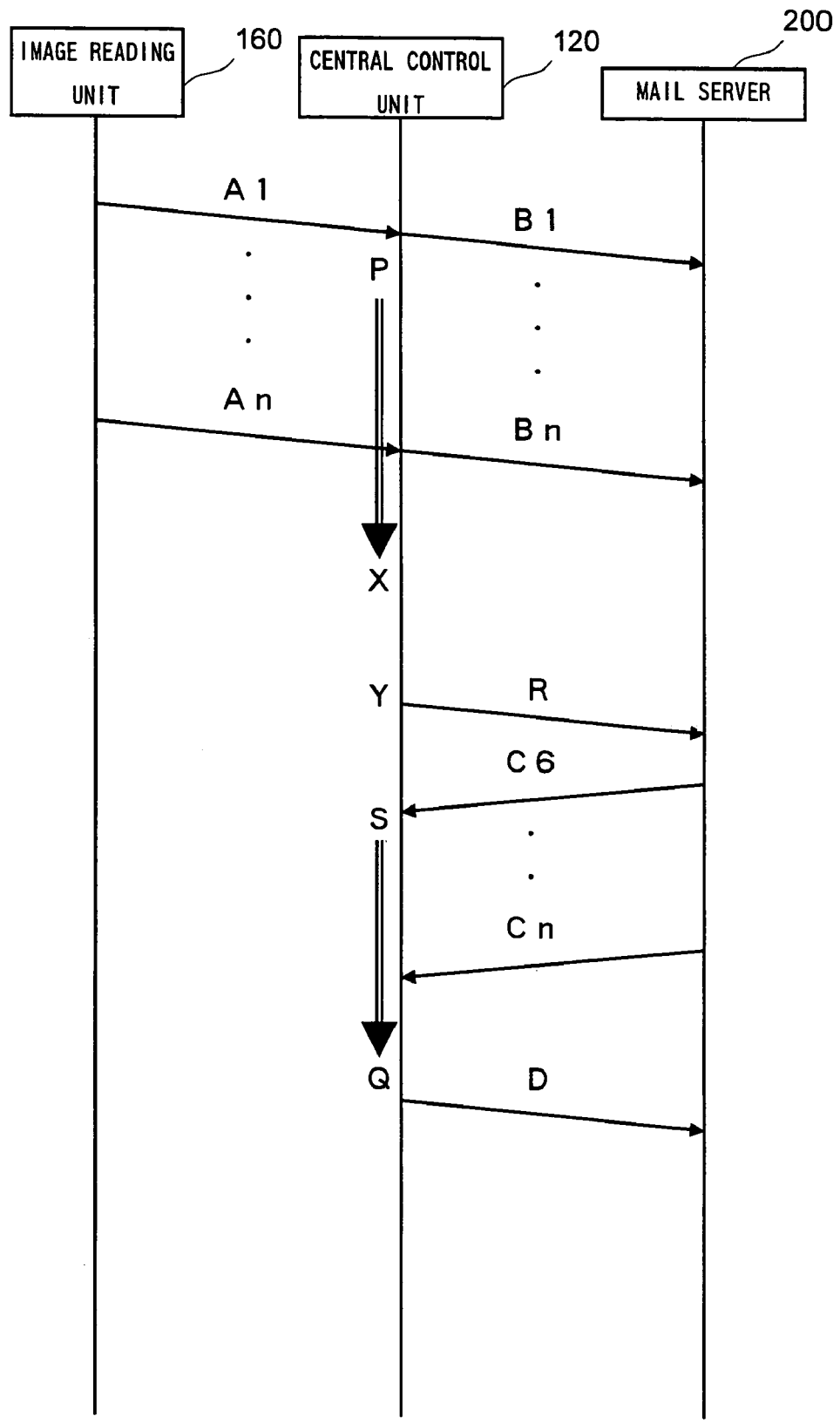
FIG. 9 is a sequence diagram showing the operation of the apparatuses in a case where a power failure occurs in the middle of a fax transmission and the image data is erased from the volatile memory 130 after n pages of document have been scanned.

Next, a case where the image data is erased from the volatile memory 130 in the middle of a fax transmission due to some problem like a power failure will be explained. FIG. 9 is a sequence diagram showing the operation of the apparatuses in a case where a power failure occurs in the middle of a fax transmission (with timing X) and the image data is erased from the volatile memory 130 after n pages of document have been scanned.

As shown in FIG. 9, the fax transmission/reception unit 150 starts transmitting the image data by fax with timing P. A power failure then occurs with timing X in the middle of the fax transmission after n pages of document has been scanned and the image data obtained through the scanning has been transmitted to the mail server 200. The MFP 100 then refers to "the number of transmitted pages" in the document scan log shown in FIG. 5B to recognize the number of not-transmitted pages.

In the example shown in FIG. 9, when the MFP 100 recovers from the power failure with timing Y, the central control unit 120 transmits a request signal R requesting the mail server 200 to transmit pages of image data that have not been transmitted by fax yet. The signal R may be a set of commands defined in the POP3 protocol that has been mentioned earlier, and the signal R specifies each iFAX electronic mail to be downloaded. The MFP 100 identifies each iFAX electronic mail to be downloaded by referring to the iFAX transmission log shown in FIG. 5A. This enables the MFP 100 to acquire image data corresponding to, for example, page 6 to page n of the scanned document (C6-Cn), as shown in FIG. 9.

Figure 6:
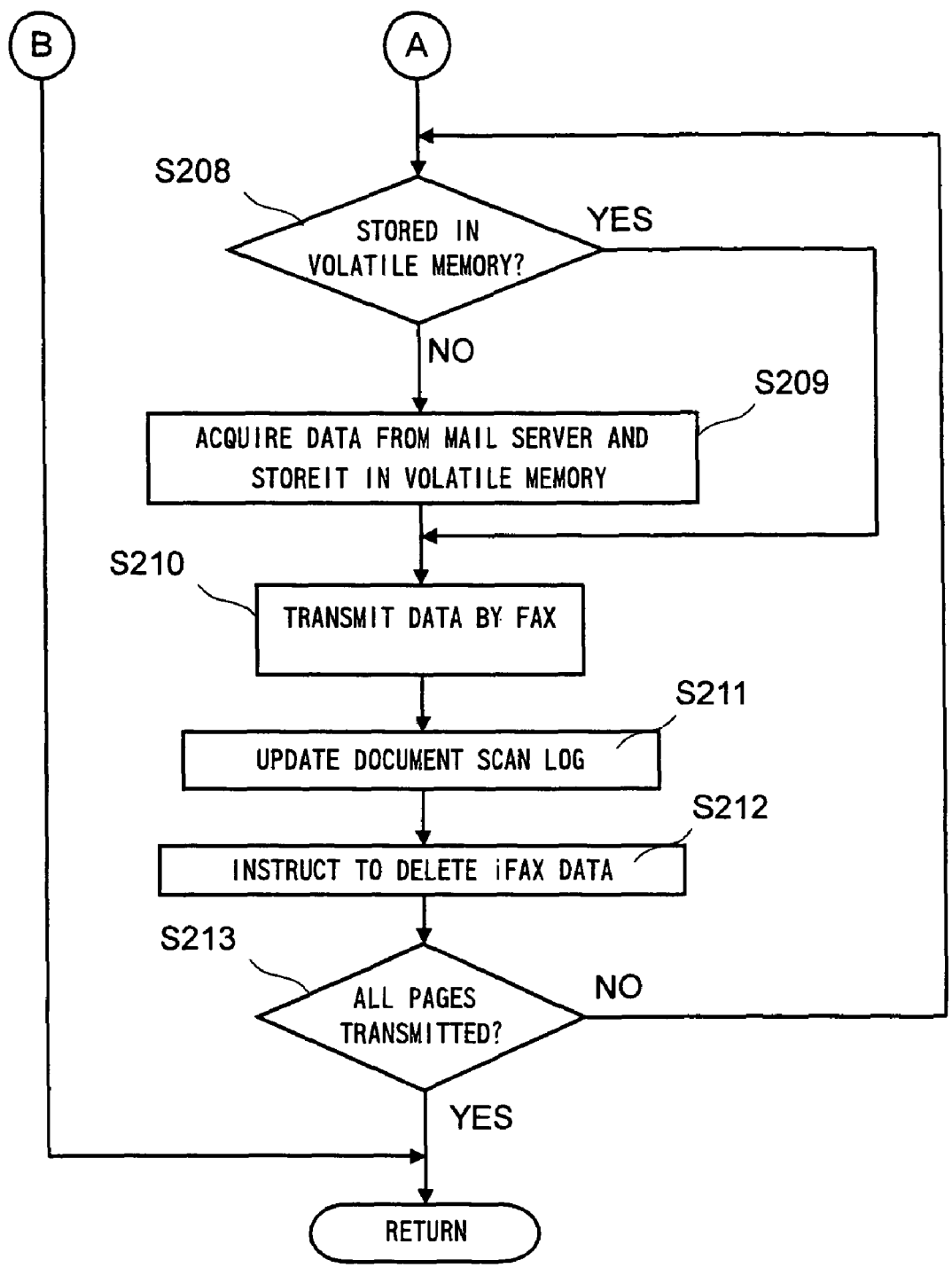
FIG. 6 is a flowchart of the procedures of the central control unit 120 for transmitting image data, which is obtained by the image reading unit 160 through scanning a document, by fax.

The MFP 100 resumes the fax transmission with timing S as soon as it starts to receive the iFAX electronic mails from the mail server 200. After transmitting the remaining faxes in sequence, the MFP 100 completes transmission of the faxes with timing Q. In the examples shown in FIG. 9 and FIG. 8, the delete command D instructing to delete the iFAX electronic mails is transmitted to the mail server 200, with timing Q. However, as shown in the flowchart of FIG. 6, an instruction to delete the electronic mail containing the downloaded iFAX may be issued to the mail server 200 each time a page of image data has been downloaded.

The MFP 100 may check, each time power is turned on and/or each time the MFP 100 recovers from a power failure, if there is a need to acquire image data from the mail server 200, by referring to various types of log information stored in the nonvolatile memory 140 to detect any fax transmission job that has not been completed yet, with one or more pages yet to be transmitted. If there is, the MFP 100 transmits a request specifying each iFAX electronic mail to be downloaded to the mail server 200 to acquire necessary pages of image data.

Embodiment 3

Figure 10:
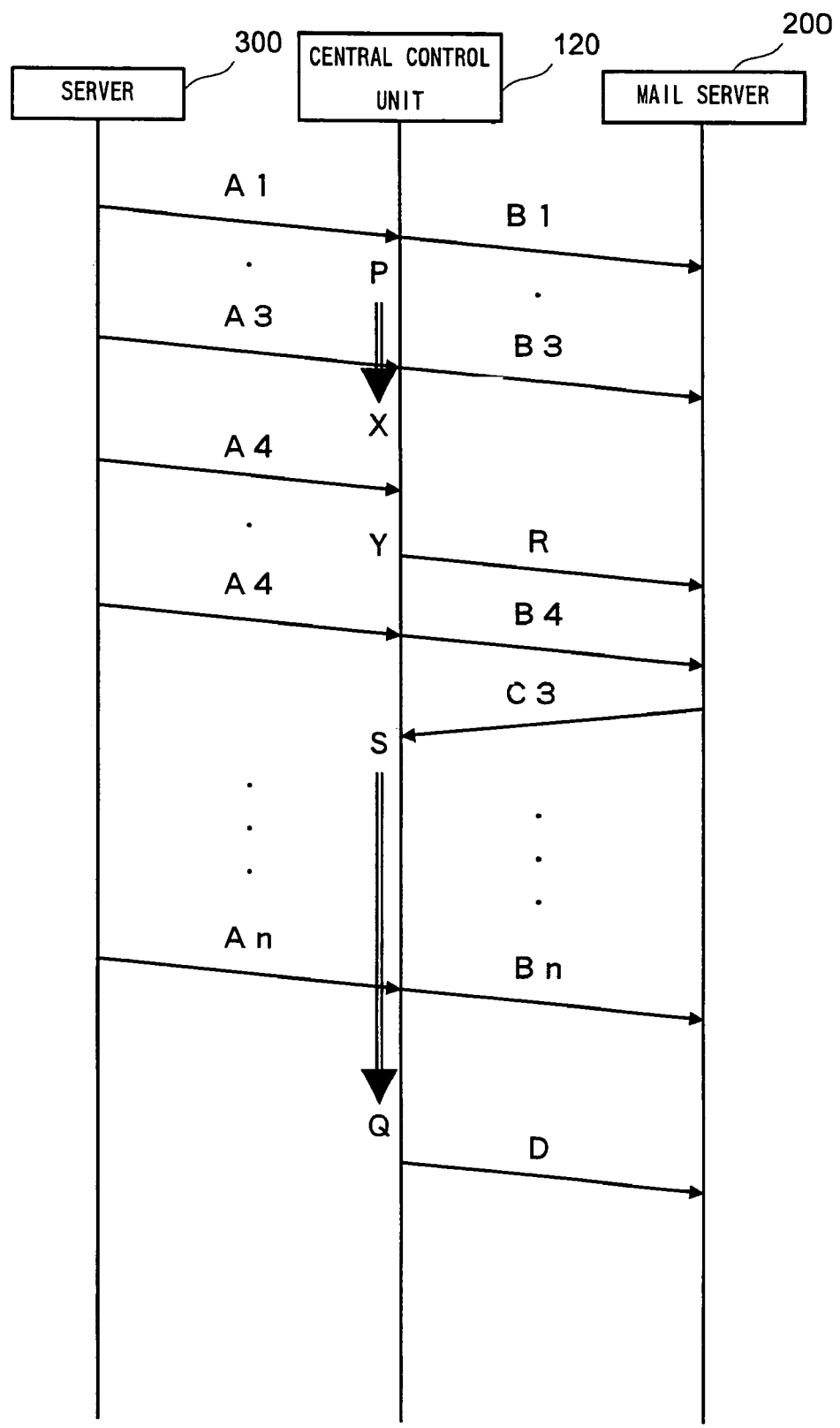
FIG. 10 is a sequence diagram showing the operation of the apparatuses in a case where a problem such as a power failure occurs in the middle of a transmission of normal fax data from the server 300 to the MFP 100 via a public telephone line.

Embodiment 3 deals with a case where a problem such as a power failure occurs in the middle of a transmission of normal fax data from the server 300 to the MFP 100 via a public telephone line. FIG. 10 is a sequence diagram showing the operation of the apparatuses in such a case.

As shown in FIG. 10, an image forming operation starts with timing P when the first page of normal fax data is transmitted. A power failure then occurs with timing X. By the time the power failure occurs, the central control unit 120 has received data of the document page 3 (A3) from the server 300 and has transmitted it (B3) to the mail server 200, but has not finished printing it. When a power failure occurs with such timing, a portion of normal fax data corresponding to the document page 3 is erased from the volatile memory 130.

While the power failure continues, the server 300 cannot transmit page 4 and onwards of normal fax data to the MFP 100 normally, and in the present embodiment, repeats transmitting the page 4 (A4) until the page 4 is completely received by the central control unit 120 in an appropriate manner.

In the example shown in FIG. 10, the MFP 100 recovers from the power failure with timing Y. However, data of the page 3 has been erased from the volatile memory 130 in spite of the fact that the page 3 has not been printed completely yet. As a result, to complete the printing, it is first required to acquire the data of the page 3 from the mail server 200. It should be noted here that in the present embodiment, for example, the fax reception log (recorded in the nonvolatile memory 140) shown in FIG. 3 contains information regarding the page number of a page that was printed last, as part of the information indicating progress of the image processing. With this arrangement, it is possible to detect whether the page 3 of the fax data has been printed or not.

The central control unit 120 refers to the fax reception log to detect the page number of a page that was printed last, and also refers to the iFAX transmission log to detect the page number of a page that was transmitted by iFAX last. The central control unit 120 then compares the page numbers with each other, and acquires, from the mail server 200, an iFAX electronic mail that corresponds to a page that has been transmitted by iFAX but has not been printed yet.

After the MFP 100 recovers from the power failure with timing Y, the central control unit 120 first refers to the fax reception log and the iFAX transmission log recorded in the nonvolatile memory 140 to detect a page of fax data that has been transmitted by iFAX but has not been printed yet. In the example shown in FIG. 10, the fax data has been transmitted by iFAX up to page 3, and has been printed up to page 2. As a result, the central control unit 120 transmits, with timing Y, a request signal R (a set of commands) to the mail server 200, requesting the mail server 200 to transmit an iFAX electronic mail that corresponds to the page 3. Although the central control unit 120 receives page 4 of normal fax data (A4) from the server 300 and transmits it (B4) to the mail server 200 by iFAX after the recovery from the power failure, the printing operation is resumed with timing S when the central control unit 120 receives page 3 of fax data (C3) from the mail server 200. After this, page 4 and onwards are printed in sequence based on the normal fax data received from the server 300. The central control unit 120 issues the delete command D instructing to delete the iFAX electronic mails to the mail server 200, with timing Q when all n pages have been printed completely.

To achieve the above-described procedures, the central control unit 120 may execute a process for identifying each iFAX electronic mail to be downloaded from the mail server 200 and a process for actually downloading each of the identified iFAX electronic mails, after the MFP 100 has recovered from a power failure. Also, the central control unit 120 may execute a process for resuming the printing after downloading the data necessary for resuming the printing operation (in the case the example shown in FIG. 10, after downloading the data of page 3).

Embodiment 4

The following describes the fourth embodiment of the present invention. Though a detailed explanation has been omitted so far, it is preferable that the iFAX data downloaded from the mail server 200 is converted into an appropriate format for the image forming process, which is performed by the image forming unit 170, before it is stored in the volatile memory 130. In Embodiment 4, for example, if the MFP 100 is in the wait state after a recovery from a power failure, the iFAX data is converted into a certain image format, making full use of the wait state. A possible case where the MFP 100 enters the wait state is when, using an electrophotographic type print engine, the MFP 100 must wait until a fixing roller of a fix apparatus reaches a temperature high enough to print an image.

Figure 11:
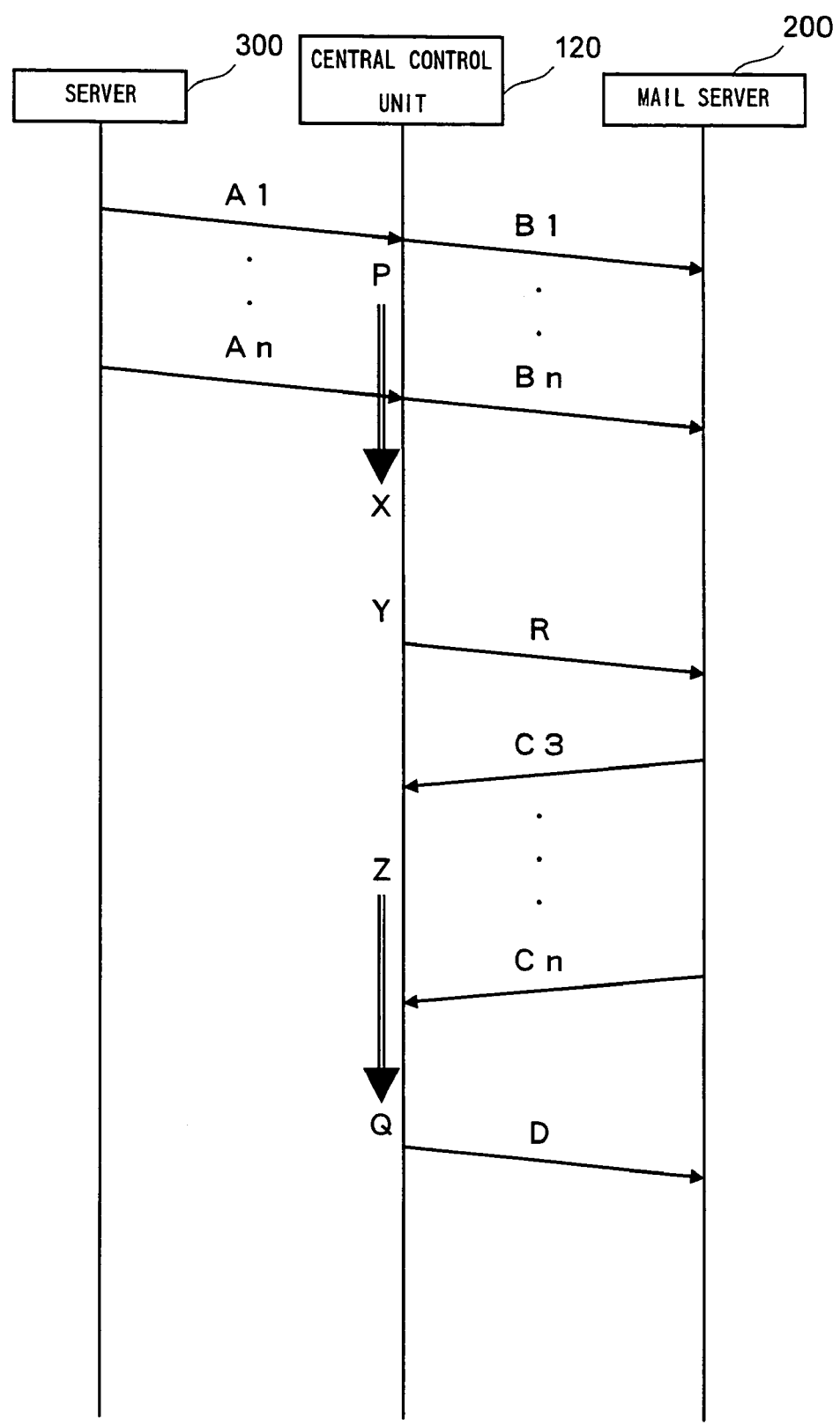
FIG. 11 is a sequence diagram showing a sequence of operations of the apparatuses when the central control unit 120 downloads an iFAX electronic mail from the mail server 200 and converts the iFAX data into an appropriate format while the MFP 100 is in the wait state after a recovery from a power failure.

FIG. 11 is a sequence diagram showing a sequence of operations of the apparatuses when the central control unit 120 downloads an iFAX electronic mail from the mail server 200 and converts the iFAX data into an appropriate format while the MFP 100 is in the wait state after a recovery from a power failure. In the example shown in FIG. 11, the central control unit 120 receives n pages of normal fax data (A1-An) from the server 300, and transmits the received data (B1-Bn) to the mail server 200 by iFAX.

In the present example, the central control unit 120 starts printing with timing P when it receives the first page of normal fax data (A1). Also, a power failure occurs with timing X before all of the n pages of data are completely printed. That is to say, the printing stops with timing X. It is supposed here that the fax reception log recorded in the nonvolatile memory 140 contains information indicating the page number of a page that was completely printed last.

After the MFP 100 recovers from the power failure with timing Y, the central control unit 120 detects that the image data has been erased from the volatile memory 130, and therefore refers to the fax reception log recorded in the nonvolatile memory 140 to identify each iFAX electronic mail to be downloaded from the mail server 200, and transmits a request signal R requesting the mail server 200 to transmit the identified iFAX electronic mails. In the present example, iFAX electronic mails corresponding to page 3 and onwards of image data that have not been printed yet are downloaded in sequence.

The wait state of the MFP 100 continues until timing Z. During the wait state, iFAX electronic mails are downloaded starting with an iFAX electronic mail corresponding to page 3 (C3), and pieces of iFAX data contained in the downloaded iFAX electronic mails are converted into an appropriate format in sequence. This enables the printing operation after the wait state, that is, after timing Z to be performed smoothly. As is the case with the earlier-described embodiments, the central control unit 120 issues the delete command D instructing to delete the electronic mails containing iFAXes of the image data to the mail server 200, with timing Q when all pages have been completely printed.

To achieve the above-described procedures of the present embodiment, the central control unit 120 may execute a process for identifying each iFAX electronic mail to be downloaded from the mail server 200 and a process for actually downloading each of the identified iFAX electronic mails, after the MFP 100 has recovered from a power failure. Also, the central control unit 120 may be set to convert the downloaded pieces of image data into an appropriate format in sequence while the MFP 100 is in the wait state. Since the wait state is generally controlled by a different program, the program may be written to cause the central control unit 120 to download and convert pieces of image data in sequence during the wait state. This enables the central control unit 120 to download and convert image data as much as possible during the wait state.

Embodiment 5

Figure 12:
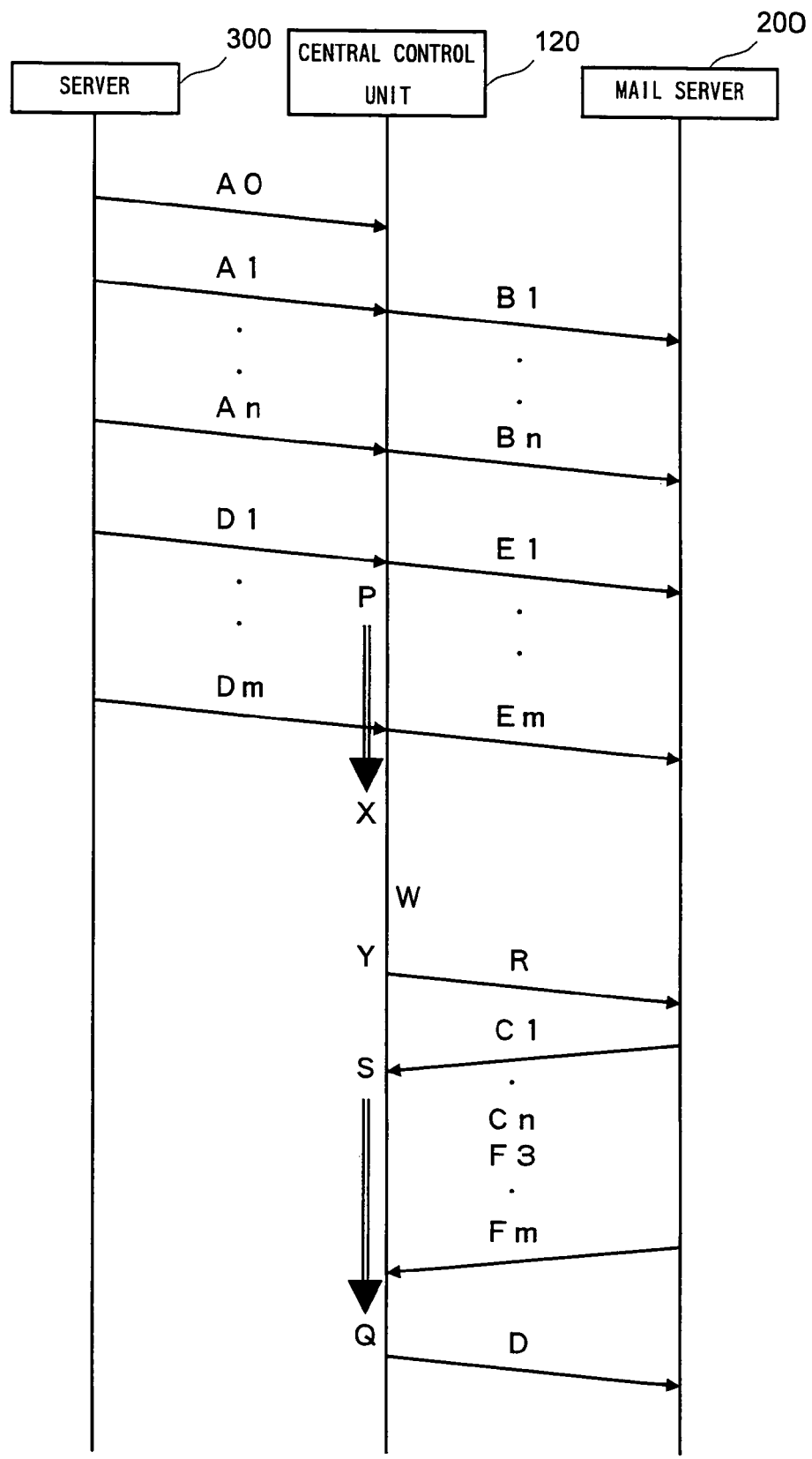
FIG. 12 is sequence diagram showing the operation of the apparatuses in a case where the server 300 transmits to the MFP 100 a set of fax data for a print job that specifies a scheduled printing start time.

The following describes the fifth embodiment of the present invention which deals with a case where the server 300 transmits to the MFP 100 a set of fax data for a print job (image processing job) that specifies a scheduled printing start time. Hereinafter, such a set of fax data for a print job that specifies a scheduled printing start time of the fax data is referred to as "print-scheduled fax data" and a set of fax data without a scheduled printing start time is referred to as "unscheduled fax data". FIG. 12 is sequence diagram showing the operation of the apparatuses in such a case.

In the example shown in FIG. 12, the server 300 transmits to the MFP 100 n pages of print-scheduled fax data (A1-An), in sequence. It is supposed in the present embodiment that prior to the transmission of a set of print-scheduled fax data, a signal (A0) indicating the scheduled start time of the set of print-scheduled fax data is transmitted. In the example shown in FIG. 12, the scheduled start time is timing W.

In the present example, the server 300 then transmits pieces of unscheduled fax data (D1-Dm) to the MFP 100. The image forming unit 170 starts printing received pieces of fax data in sequence with timing P when the first page of the fax data (D1) has been received. At the same time, a transmission of iFAXes (E1-Em) to the mail server 200 starts. A power failure occurs with timing X before page m of the fax data is completely printed. The power failure erases the fax data (including print-scheduled fax data) from the volatile memory 130.

The scheduled start time (timing W) for the print-scheduled fax data (A1-An) is reached during the power failure. As a result, printing of the print-scheduled fax data cannot be started at the scheduled start time. The MFP 100 recovers from the power failure with timing Y, which enables the MFP 100 to resume printing of the received fax data by acquiring iFAX data from the mail server 200. In the present embodiment, however, in such a case, the print-scheduled fax data is printed first on a priority basis, prior to the unscheduled fax data.

More specifically, the central control unit 120 transmits a request signal R requesting the mail server 200 to transmit iFAX electronic mails, specifying that iFAX electronic mails corresponding to the print-scheduled fax data should be transmitted first. With this instruction, iFAX electronic mails corresponding to the print-scheduled fax data (C1-Cn) are downloaded first. Following this, iFAX electronic mails (F3-Fm) corresponding to part of the normal fax data for a print job that has been suspended due to the power failure are downloaded. The downloaded pieces of iFAX are printed in sequence in the stated order. Then, as is the case with the earlier-described embodiments, the central control unit 120 issues the delete command D instructing to delete the iFAX electronic mails to the mail server 200, with timing Q when all pages have been completely printed.

To achieve the above-described procedures, in the present embodiment, the fax reception log recorded in the nonvolatile memory 140 contains "scheduled start time" information indicating a scheduled printing start time for each print job that has been specified as a scheduled print job.

Figure 13:
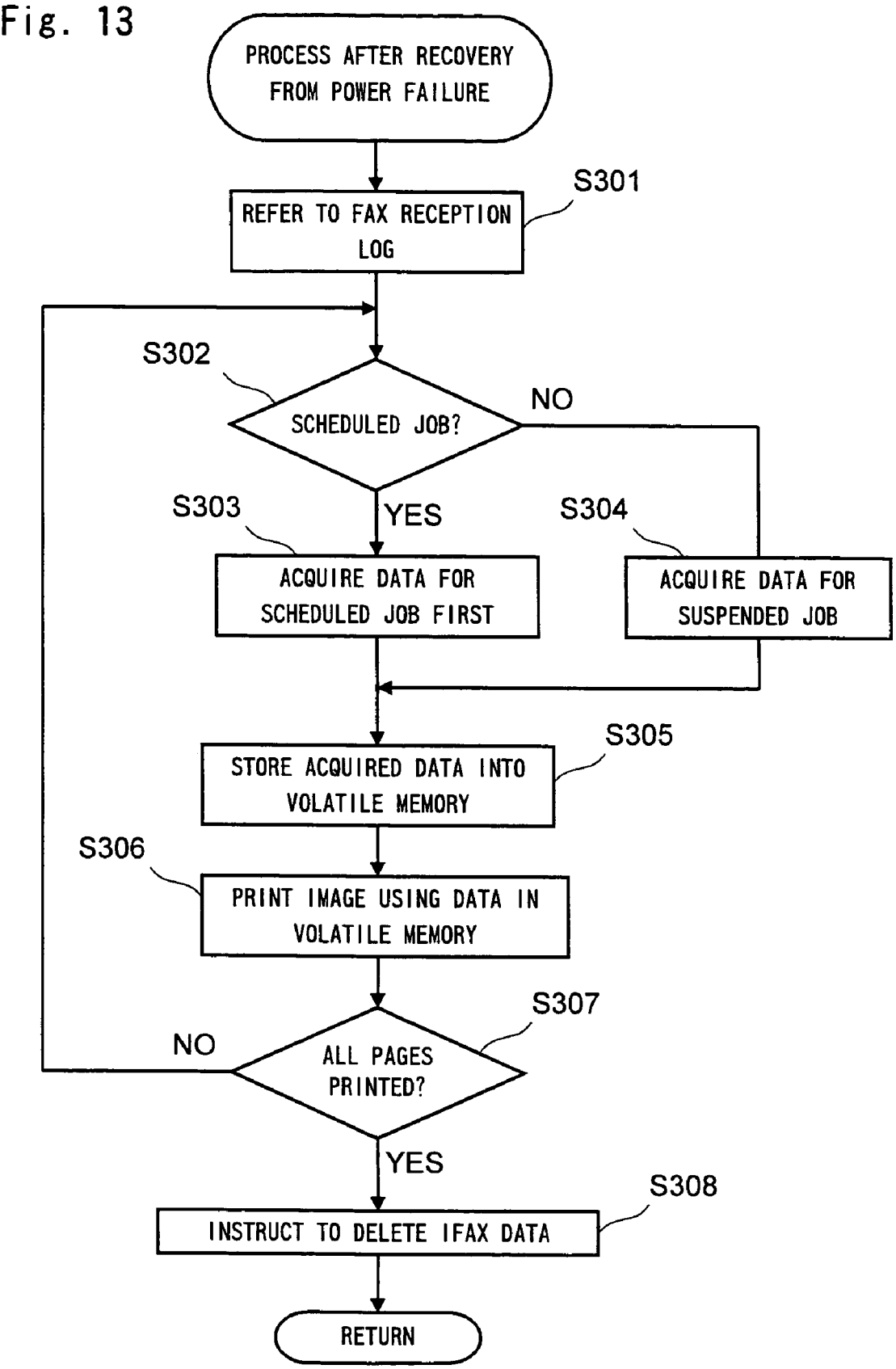
FIG. 13 is a flowchart showing an example of procedures performed by the central control unit 120 when the MFP 100 receives a set of fax data for a print job that specifies a scheduled printing start time.

FIG. 13 is a flowchart showing an example of procedures performed by the central control unit 120 in the present embodiment. After the MFP 100 recovers from a power failure, the central control unit 120 first refers to the fax reception log (S301), and judges whether there is a scheduled print job to be executed (S302). More specifically, in step S302, it is judged whether there is a scheduled print job having a scheduled printing start time that has already been reached. If it is judged that there is a scheduled print job to be executed (S302: "YES"), the central control unit 120 acquires iFAX data corresponding to the scheduled print job first on a priority basis (S303).

If it is judged that there is no scheduled print job to be executed, where this negative judgment can be made when all the necessary data for the scheduled print job has been acquired (S302: "NO"), the central control unit 120 acquires iFAX data corresponding to a print job that has been suspended due to the power failure (S304). In either case of step S303 or S304, the acquired iFAX data is expanded to image data and the image data is stored in the volatile memory 130 (S305). The printing is performed using the image data stored in the volatile memory 130 (S306). Then, it is judged whether all pages have been printed (S307). If it is judged that all pages have been printed (S307: "YES"), the central control unit 120 transmits an instruction to delete the iFAX data to the mail server 200 (S308).

In the present embodiment, a scheduled image formation job is executed earlier than an unscheduled image formation job on a priority basis when the scheduled start time is reached during an execution of the normal image formation job. However, not limited to this, the suspended unscheduled image formation job may be executed earlier than the scheduled image formation job in the same situation.

Embodiment 6

Figure 14:
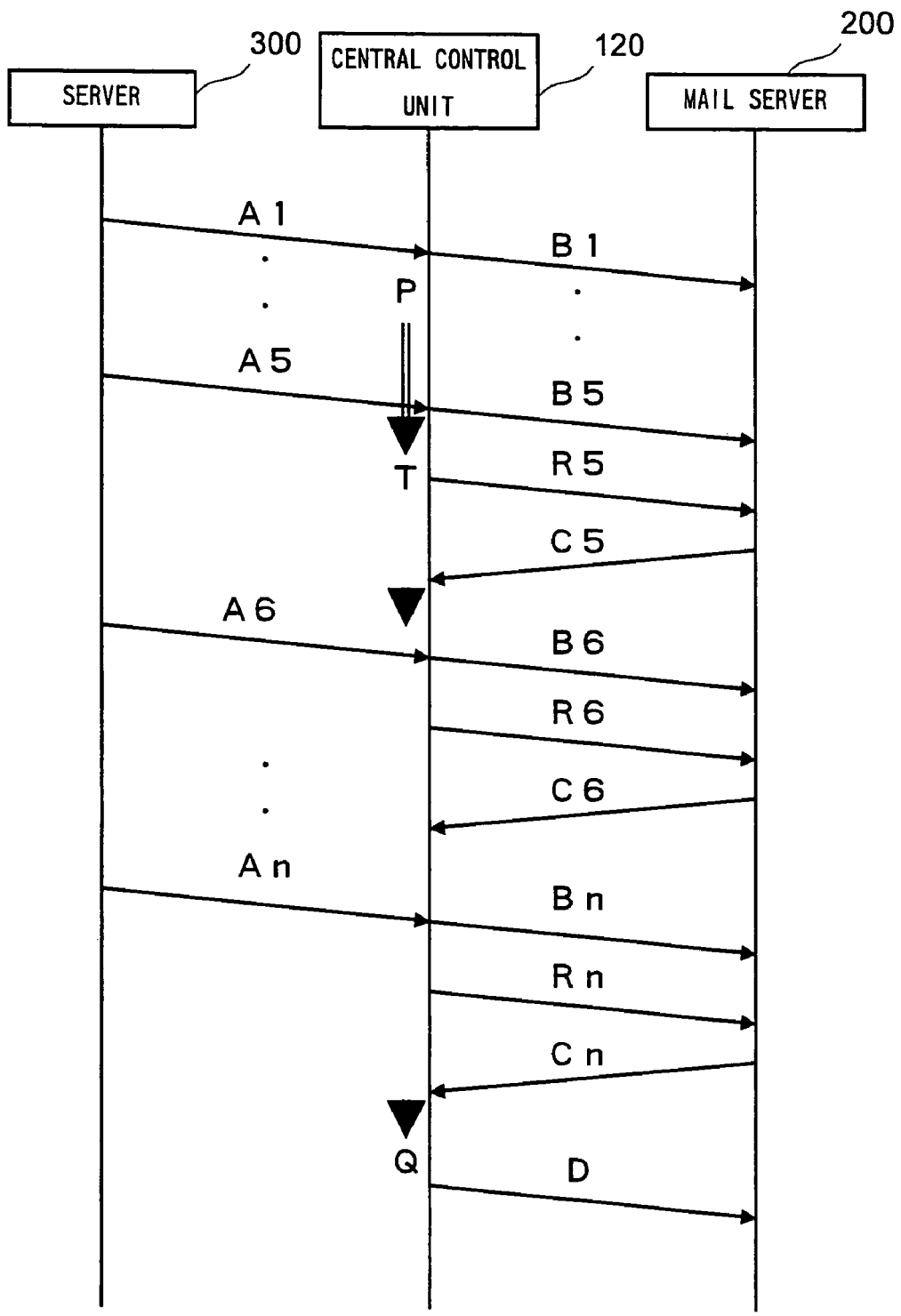
FIG. 14 is sequence diagram showing the operation of the apparatuses in a case where the capacity of the volatile memory 130 is not enough to process normal fax data received from the server 300.

Embodiment 6 of the present invention deals with a case where the capacity of the volatile memory 130 is not enough to store all of normal fax data received from the server 300. Such a problem occurs when, for example, the speed of the image formation by the image forming unit 170, which uses the image data stored in the volatile memory 130, is not sufficiently fast. FIG. 14 is sequence diagram showing the operation of the apparatuses in such a case. As shown in FIG. 14, the central control unit 120 starts printing with timing P when the first page of normal fax data (A1) has been received. At the same time, the central control unit 120 transmits the first page to the mail server 200 by iFAX (B1). In the present example, when page 5 (A5) of normal fax data is received, the volatile memory 130 has consumed the available storage space and becomes unable to store the image data of page 5, due to a slow printing speed. When this happens, in the present embodiment, the central control unit 120 transmits the received page 5 of normal fax data to the mail server 200 by iFAX (B5), without expanding it to the volatile memory 130 (i.e. without storing it in the volatile memory 130).

When a certain amount of free space is created again in the volatile memory 130 (with timing T), the central control unit 120 transmits a request signal R5 requesting the mail server 200 to transmit iFAX data corresponding to page 5. Upon receiving the iFAX data (C5), the central control unit 120 expands the iFAX data to image data, stores the image data into the volatile memory 130, and prints page 5 using the image data. For each of received pages from 6 to n of the normal fax data, the central control unit 120 repeats the following procedures: (1) transmits the received page to the mail server 200 by iFAX, without expanding it to the volatile memory 130; (2) when a certain amount of free space is created in the volatile memory 130, transmits a request signal requesting the mail server 200 to transmit iFAX data corresponding to the page; and (3) receives the iFAX data, expands it to image data, stores the image data into the volatile memory 130, and prints the page using the image data. The central control unit 120 then issues the delete command D instructing to delete the iFAX data to the mail server 200, with timing Q when all of the n pages have been printed.

Embodiment 7

Embodiment 7 of the present invention deals with a case where the volatile memory 130 has a capacity only sufficient to store image data corresponding to one page of a document. The present invention applied to this case enables a plurality of pages of fax data transmitted from the server 300 in sequence to be printed.

Figure 15:
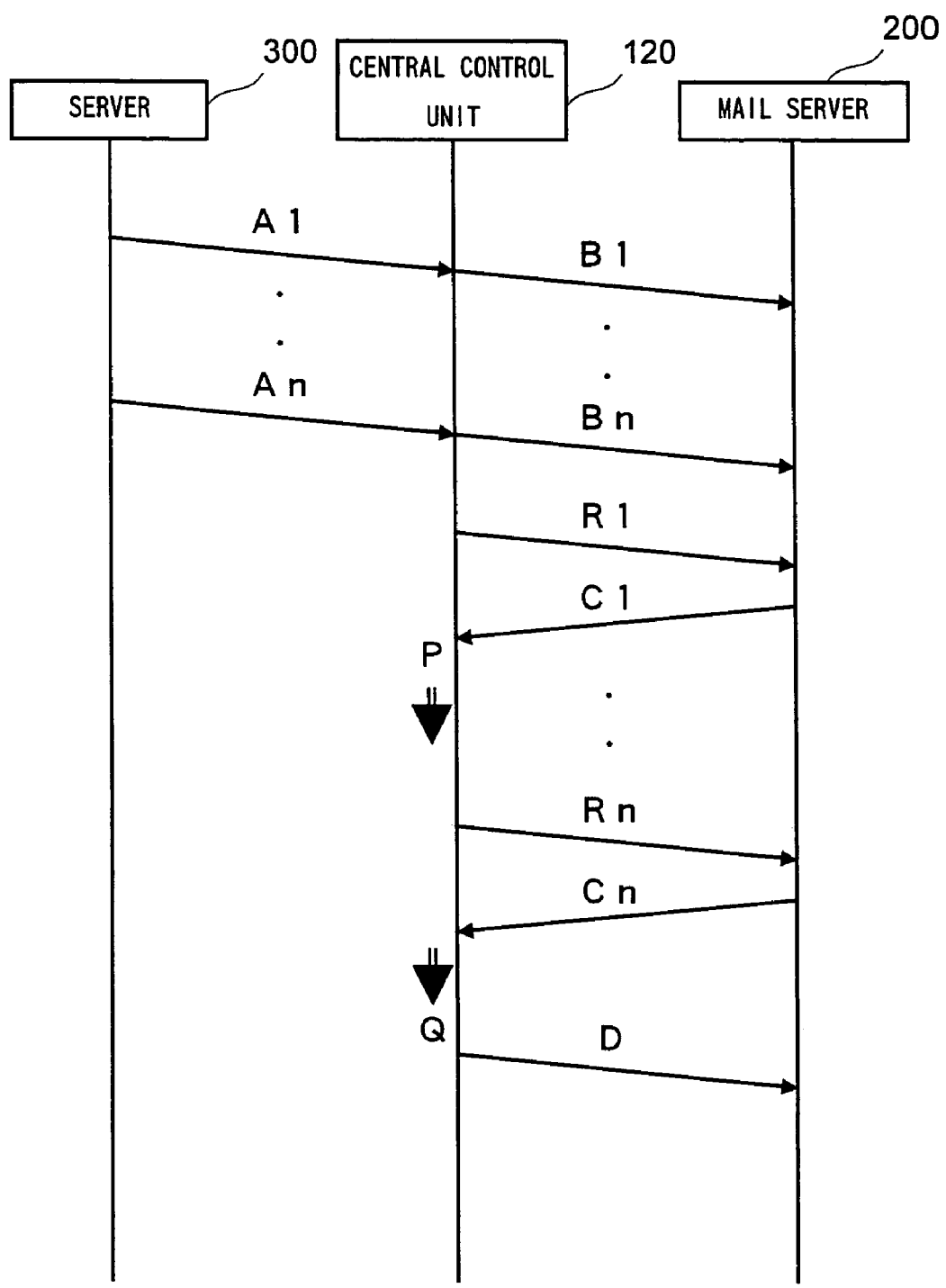
FIG. 15 is a sequence diagram showing the operation of the apparatuses in a case where the volatile memory 130 has a capacity only sufficient to store image data corresponding to one page of a document.

FIG. 15 is a sequence diagram showing the operation of the apparatuses in the case where the volatile memory 130 has a capacity only sufficient to store image data corresponding to one page of a document.

As shown in FIG. 15, n pages of fax data (A1-An) transmitted from the server 300 in sequence are transmitted to the mail server 200 in sequence by iFAX (B1-Bn), without expanding it to the volatile memory 130 (i.e. without storing it in the volatile memory 130).

Then, the central control unit 120 transmits a request signal R1 requesting the mail server 200 to transmit iFAX data corresponding to the first page of the document. In response to the request, the mail server 200 transmits iFAX data corresponding to the first page of the document to the MFP 100 (C1). Upon receiving the iFAX data (C1), the central control unit 120 expands the iFAX data to image data, stores the image data into the volatile memory 130, and starts printing with timing P.

After this, each time one page of the document is printed, that is, each time the storage space of the volatile memory 130 is freed, the central control unit 120 transmits a request signal ( . . . Rn) and performs printing. The central control unit 120 issues the delete command D instructing to delete iFAX electronic mails to the mail server 200, with timing Q when all of the n pages have been printed.

The procedures disclosed above in the present embodiment can also be applied to a case where an HDD, which is contained in an MFP to store received pieces of fax data in sequence so that the pieces of stored fax data are expanded to image data and stored into the volatile memory 130 in sequence for use in printing, has consumed the available storage space and cannot store fax data any more for the time being.

Embodiment 8

Embodiment 8 of the present invention deals with a case where an HDD, which is contained in an MFP to store received pieces of fax data in sequence so that the pieces of stored fax data are expanded to image data and stored into the volatile memory 130 in sequence for use in printing, has consumed the available storage space and becomes unable to store fax data in the middle of receiving normal fax data from the server 300. It should be noted here that the situation dealt with in Embodiment 8 is similar to that described in Embodiment 6 above and therefore can be dealt with by the method of Embodiment 6. However, Embodiment 8 deals with the situation in a different manner from Embodiment 6.

Figure 16:
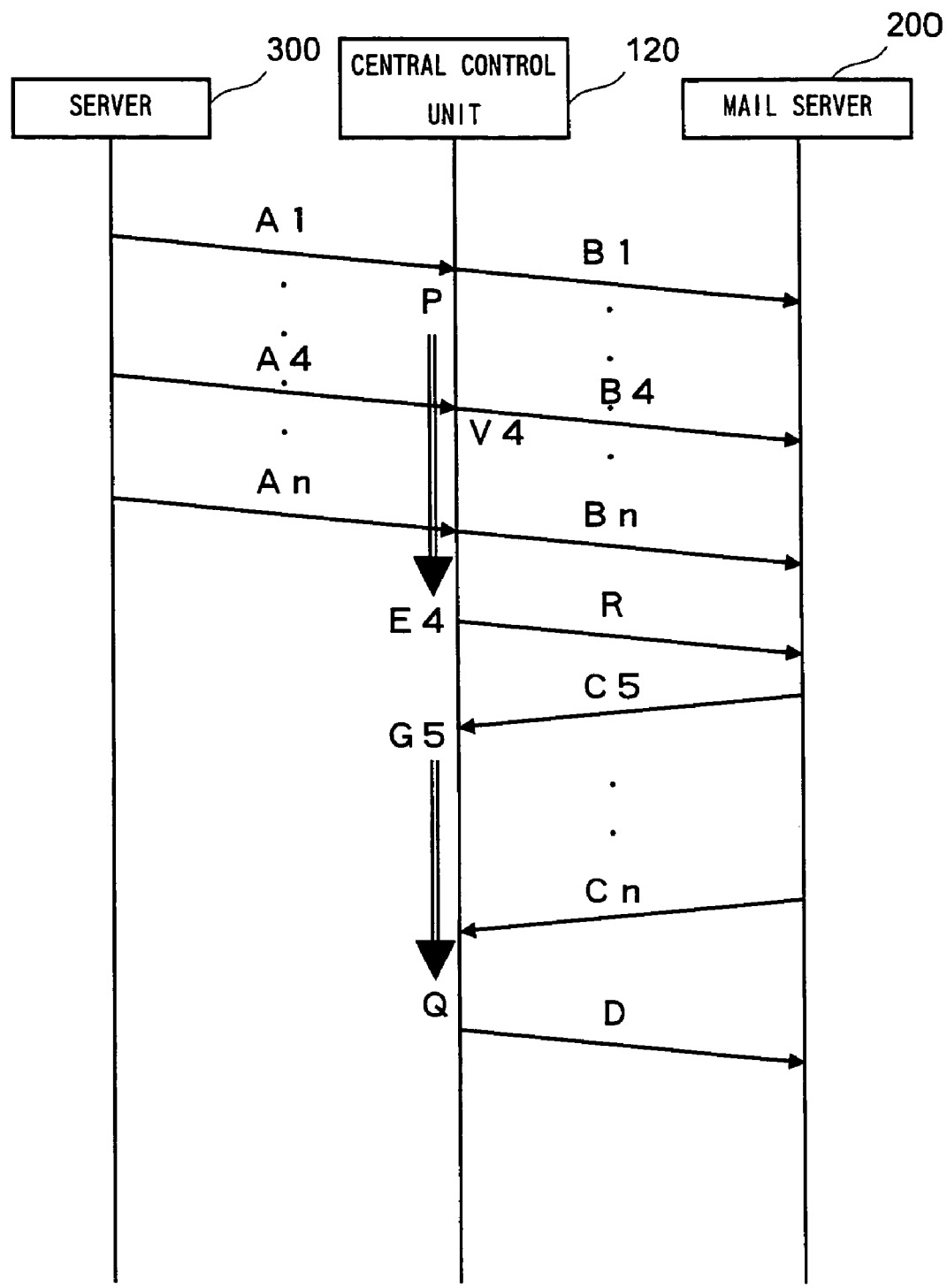
FIG. 16 is a sequence diagram showing the operation of the apparatuses in such a case where the HDD has consumed the available storage space in the middle of reception of fax data.

FIG. 16 is a sequence diagram showing the operation of the apparatuses in such a case where the HDD has consumed the available storage space in the middle of reception of fax data. In the example shown in FIG. 16, the central control unit 120 receives n pieces of normal fax data (A1-An) from the server 300 in sequence, stores the received fax data into the HDD, expands the stored fax data to image data, stores the image data into the volatile memory 130, and performs printing using the image data stored in the volatile memory 130. The HDD then consumes the available storage space and becomes unable to store fax data with timing V4 after it has stored the fourth page of fax data. At this point in time, the printing has been continued after it has been started with timing P when the first page of fax data has been received.

When the HDD becomes full as described above, in the present embodiment, the central control unit 120 transmits the received page 5 and onwards of normal fax data to the mail server 200 by iFAX (B5-Bn), without storing it in the HDD. The central control unit 120 completes printing of page 4 with timing E4 using the data stored in the HDD. Since data of page 5 and onwards are not stored in the HDD, the central control unit 120 needs to acquire the data from the mail server 200. As a result, the central control unit 120 transmits a request signal R requesting the mail server 200 to transmit iFAX data corresponding to page 5 and onwards.

The central control unit 120 then resumes printing with timing G5 when it acquires iFAX data corresponding to page 5 from the mail server 200, and continues printing using iFAX data downloaded together with electronic mails from the mail server 200. The central control unit 120 issues the delete command D instructing to delete the iFAX data to the mail server 200, with timing Q when all of the n pages have been printed.

A program for realizing the image processing apparatus of the present invention may be recorded in various computer-readable recording mediums which include: magnetic tape, magnetic disks such as flexible disks, optical discs such as DVD, CD-ROM, CD-R, MO, and PD, flash-memory-type recording mediums such as Smart Media (trademark registered) and COMPACTFLASH (trademark registered). The program may be manufactured or transferred in a form of such a recording medium, or may be directly transmitted or supplied via a wired or wireless network such as the Internet, broadcasting, an electric communication line, a satellite communication, or the like.

The program for realizing the present invention does not necessarily contain all modules that cause a computer to execute the above-explained processing. However, general-purpose programs (for example, a communication program or a program contained in an operating system) that can be installed independently in information processing apparatuses may be used as necessary to cause a computer to execute each process of the present invention.

Accordingly, a recording medium of the present invention does not necessarily contain all of the above-stated modules. Also, it is not necessarily required to transmit all of the modules to allow the receiving end to achieve the present invention. Furthermore, dedicated hardware units may be used to execute predetermined processes.

Modifications

Up to now, the present invention has been described through various embodiments. However, the present invention is not limited to the embodiments described above. For example, in each embodiment, an image processing apparatus of the present invention is described as the MFP 100. However, the present invention can be applied to other various types of image processing apparatuses such as a scanner, a printer, a fax apparatus, or the like in so far as it can store image data in a volatile memory, and can perform various types of image processing such as printing, fax transmission, data transmission via a network, generation of image data by scanning a document or the like using the image data stored in the volatile memory.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image processing apparatus for transmitting and receiving data to/from an external apparatus that has a storage apparatus, the image processing apparatus comprising:
   a first data acquiring unit that acquires image data to be subjected to image processing;
   a storage unit that stores the acquired image data;
   a transmission unit that transmits the acquired image data to the external apparatus so that the acquired image data is stored in both the storage apparatus thereof and the storage unit;
   a judgment unit that judges, prior to commencement of the image processing, whether the image data is stored in the storage unit;
   a second data acquiring unit that acquires the image data from the external apparatus if the judgment unit judges negatively; and an image processing unit that executes the image processing using the image data stored in the storage unit if the judgment unit judges positively, and executes the image processing using the image data acquired by the second data acquiring unit if the judgment unit judges negatively.

2. The image processing apparatus of claim 1 further comprising a deletion instructing unit that, after the image processing is completed, sends to the external apparatus an instruction to delete the image data from the storage apparatus.

3. The image processing apparatus of claim 1, wherein the transmission unit transmits the acquired image data page by page to the external apparatus.

4. The image processing apparatus of claim 3, wherein the storage unit has a capacity only sufficient to store one page of the image data, and
each time the image processing unit completes image processing for one page of the image data stored in the storage unit, the second data acquiring unit acquires from the external apparatus another one page of the image data to be subjected to the image processing next.

5. The image processing apparatus of claim 1 further comprising a memory that stores information regarding progress of the image processing, wherein
when executing the image processing using the image data acquired by the second data acquiring unit, the image processing unit refers to the information stored in the memory and executes the image processing for a part of the image data that has not been subjected to the image processing yet.

6. The image processing apparatus of claim 5, wherein the information stored in the memory indicates pages of the image data that have already been subjected to the image processing.

7. The image processing apparatus of claim 5, wherein the memory is a nonvolatile memory.

8. The image processing apparatus of claim 1, wherein the external apparatus functions as a mail server, the transmission unit transmits to the external apparatus an electronic mail addressed to the image processing apparatus and containing the acquired image data, and
the second data acquiring unit, if the judgment unit judges negatively, acquires the electronic mail from the external apparatus and extracts the image data from the acquired electronic mail.

9. The image processing apparatus of claim 8, wherein the transmission unit converts the acquired image data into Tag Image File Format, and transmits to the external apparatus an electronic mail addressed to the image processing apparatus and containing the image data having been converted into Tag Image File Format, as an attached file.

10. The image processing apparatus of claim 1, wherein the storage unit is a volatile memory.

11. The image processing apparatus of claim 1, wherein the judgment unit judges whether the image data is stored in the storage unit each time power is turned on or each time the image processing apparatus recovers from a power failure.

12. The image processing apparatus of claim 11 further comprising:
a reception unit that receives image processing jobs each of which contains information specifying a start time at which an image processing job is to be subjected to the image processing; and
a start time judging unit that judges, each time power is turned on or each time the image processing apparatus recovers from a power failure, whether any of the image processing jobs received by the reception unit has a start time that has already reached, wherein
if the judgment unit judges negatively, and if there is an image processing job that has been judged by the start time judging unit as having a start time that has already reached, the second data acquiring unit acquires image data for the image processing job from the external apparatus earlier than image data for the remaining image processing jobs received by the reception unit.

13. The image processing apparatus of claim 1, wherein the image processing is an image forming process.

14. The image processing apparatus of claim 1, wherein the image processing is a fax transmission process.

15. The image processing apparatus of claim 1, wherein the first data acquiring unit is a receiving unit that receives print data from an external terminal connected with the image processing apparatus via a network.

16. The image processing apparatus of claim 1, wherein the first data acquiring unit is a fax receiving unit that receives fax data from an external fax apparatus.

17. An image processing method for use in an image processing apparatus that is operable to transmit and receive data to/from an external apparatus that has a storage apparatus, the image processing method comprising:
a first data acquiring step for acquiring image data to be subjected to image processing;
a storage step for storing the acquired image data in a storage unit;
a transmission step for transmitting the acquired image data to the external apparatus so that the acquired image data is stored in both the storage apparatus and the storage unit;
a judgment step for judging, prior to commencement of the image processing, whether the image data is stored in the storage unit;
a second data acquiring step for acquiring the image data from the external apparatus if the judgment unit judges negatively; and
an image processing step for executing the image processing using the image data stored in the storage unit if the judgment unit judges positively, and executing the image processing using the image data acquired by the second data acquiring step if the judgment step judges negatively.

18. A program that is run in an image processing apparatus that is operable to transmit and receive data to/from an external apparatus that has a storage apparatus, the program embodied on a non-transitory computer-readable medium and causing the image processing apparatus to execute:
a first data acquiring step for acquiring image data to be subjected to image processing;
a storage step for storing the acquired image data in a storage unit;
a transmission step for transmitting the acquired image data to the external apparatus so that the acquired image data is stored in both the storage apparatus and the storage unit;
a judgment step for judging, prior to commencement of the image processing, whether the image data is stored in the storage unit;
a second data acquiring step for acquiring the image data from the external apparatus if the judgment unit judges negatively; and
an image processing step for executing the image processing using the image data stored in the storage unit if the judgment unit judges positively, and executing the image processing using the image data acquired by the second data acquiring step if the judgment step judges negatively.

19. The image processing apparatus of claim 1, wherein the first data acquiring unit is an image reading unit which scans documents.

20. The image processing apparatus of claim 1, wherein the storage unit stores image data expanded based on the image data acquired by the first data acquiring unit.

21. The image processing apparatus of claim 1, wherein
the external apparatus is provided as a first-external apparatus,
the first data acquiring unit has a receiving unit that receives the image data from a second external apparatus,
the transmission unit transmits the acquired image data received from the second external apparatus to the first external apparatus, and
the image processing unit executes a printing process using the image data stored in the storage unit if the judgment unit judges positively, and executes the printing process using the image data acquired by the second data acquiring unit if the judgment unit judges negatively.

22. The image processing apparatus of claim 1, wherein
the first data acquiring unit has an image reading unit that acquires image data through scanning a document,
the transmission unit transmits the acquired image data read by the image reading unit to the external apparatus, and
the image processing unit executes a fax transmission process using the image data stored in the storage unit if the judgment unit judges positively, and executes the fax transmission process using the image data acquired by the second data acquiring unit if the judgment unit judges negatively.

* * * * *